United States Patent [19]

Hunt

[11] Patent Number: 5,306,911
[45] Date of Patent: * Apr. 26, 1994

[54] METHOD FOR DETERMINING THE FLOW RATE OF AQUEOUS PHASES IN A MULTIPHASE FLOW

[75] Inventor: Andrew Hunt, Askerswell, United Kingdom

[73] Assignee: Schlumberger Technology Corporation, Houston, Tex.

[*] Notice: The portion of the term of this patent subsequent to Sep. 10, 2008 has been disclaimed.

[21] Appl. No.: 843,131

[22] Filed: Feb. 28, 1992

Related U.S. Application Data

[63] Continuation-in-part of Ser. No. 756,732, Sep. 9, 1991, abandoned, which is a continuation of Ser. No. 524,246, May 16, 1990, Pat. No. 5,047,632.

[30] Foreign Application Priority Data

May 27, 1989 [GB] United Kingdom .................. 8912256

[51] Int. Cl.$^5$ .............................................. G01V 5/10
[52] U.S. Cl. .................... 250/302; 250/260; 250/269; 250/303
[58] Field of Search ............... 250/303, 302, 270, 269, 250/260, 259

[56] References Cited

U.S. PATENT DOCUMENTS

| | | | |
|---|---|---|---|
| 2,412,363 | 12/1946 | Silverman | 324/325 |
| 2,829,518 | 4/1958 | Rumble et al. | 73/155 |
| 2,991,364 | 7/1961 | Goodman | 250/262 |
| 3,395,277 | 7/1968 | Mayer, Jr. et al. | 250/260 |
| 3,546,512 | 12/1970 | Frentrop | 376/109 |
| 3,784,828 | 1/1974 | Hayes | 250/260 |
| 4,107,525 | 8/1978 | Hart, Jr. | 250/303 |
| 4,166,215 | 8/1979 | Anderson | 250/260 |
| 4,166,216 | 8/1979 | Cubberly, Jr. | 250/260 |
| 4,233,508 | 11/1980 | Arnold | 250/259 |
| 4,482,806 | 11/1984 | Wagner, Jr. et al. | 250/260 |
| 4,721,853 | 1/1988 | Wraight | 250/269 |
| 4,861,986 | 8/1989 | Arnold | 250/260 |
| 4,899,289 | 2/1990 | Appel | 364/484 |
| 5,047,632 | 9/1991 | Hunt | 250/302 |

FOREIGN PATENT DOCUMENTS

| | | |
|---|---|---|
| 0167233 | 1/1986 | European Pat. Off. . |
| 0282232 | 9/1988 | European Pat. Off. . |
| 1329051 | 9/1973 | United Kingdom . |
| 1330618 | 9/1973 | United Kingdom . |
| 1352884 | 5/1974 | United Kingdom . |
| 1515143 | 6/1978 | United Kingdom . |
| 2041761 | 4/1980 | United Kingdom . |
| 2116706 | 9/1983 | United Kingdom . |
| 2180065 | 3/1987 | United Kingdom . |
| 2194058 | 2/1988 | United Kingdom . |

OTHER PUBLICATIONS

Stanislaw Szpilowski, Grazyna Strelczak, Ryszard Winnicki, "Radioactive Tracer Method as an Instrument for Testing Effectiveness of Effluent Treatment Installations and Mixing Patterns in Natural Streams", *Nukleonika*, vol. 21, No. 5 (1976) pp. 603–618.

*Primary Examiner*—Constantine Hannaher
*Attorney, Agent, or Firm*—John J. Ryberg; Wayne I. Kanak

[57] ABSTRACT

A method for determining at least one dynamic flow characteristic of a multiphase flow circulating in a pipe, said flow being composed of an aqueous phase and a hydrocarbon (oil) phase. Oxygen atoms in the aqueous phase are activated by irradiation with neutrons at a chosen first location in the pipe. The concentration of activated oxygen at a chosen second location in the pipe is measured with a detector as a function of time t, so as to obtain at least one signal $S(t)$. Then a relationship is fitted to the signal $S(t)$ so as to derive the values of the velocity U of the aqueous phase. The slip velocity $v_s$ of a dispersed phase relative to the velocity of a continuous phase is also advantageously determined. From the values of velocities U and $v_s$ and from the volume fraction $y_1$ of the continuous phase in the pipe (obtained by an ancillary measurement), the volumetric flow rates of the phases are determined.

6 Claims, 4 Drawing Sheets

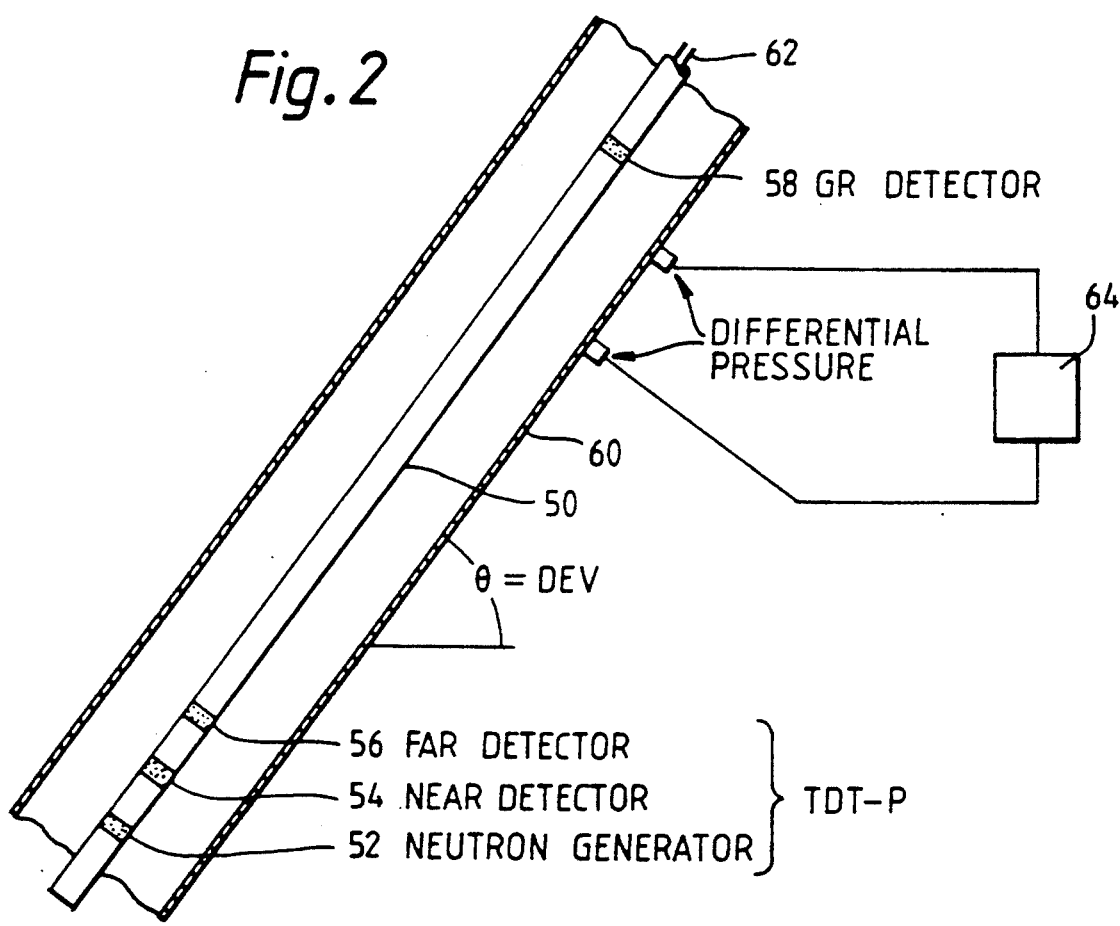

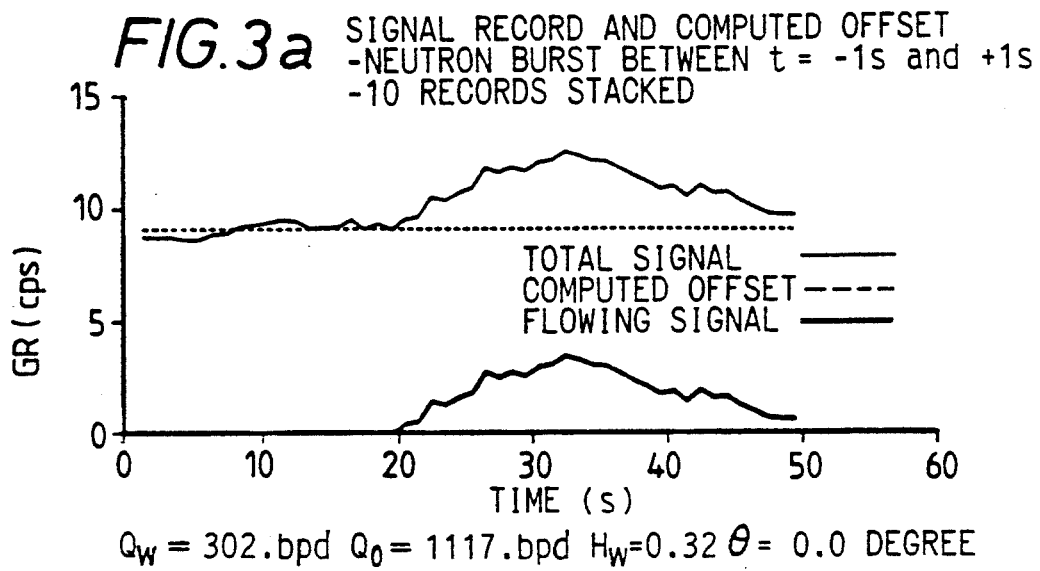

FIG.3a SIGNAL RECORD AND COMPUTED OFFSET
-NEUTRON BURST BETWEEN t = -1s and +1s
-10 RECORDS STACKED $Q_W$ = 302.bpd  $Q_0$= 1117.bpd  $H_W$=0.32  $\theta$ = 0.0 DEGREE

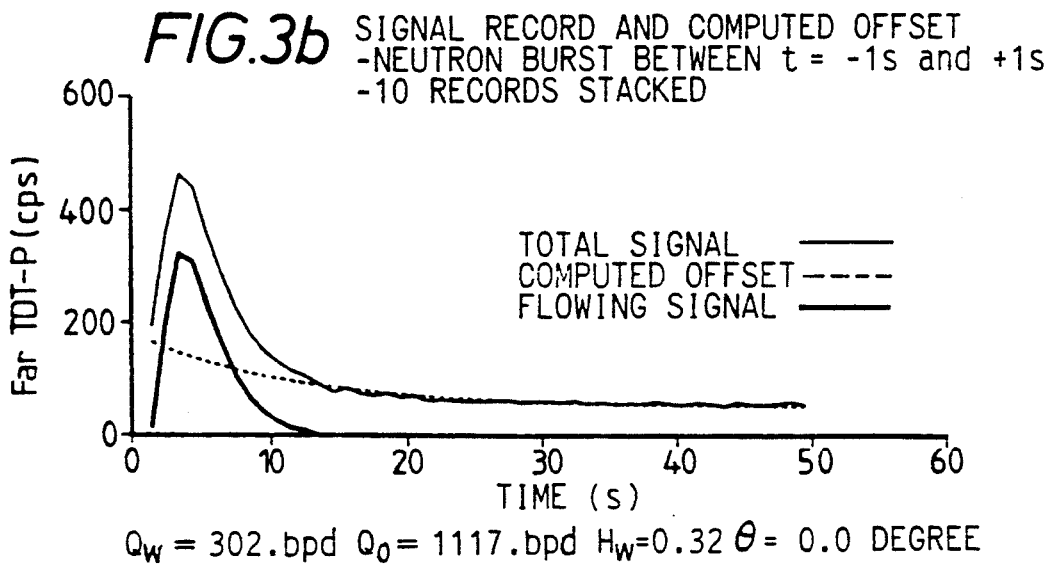

FIG.3b SIGNAL RECORD AND COMPUTED OFFSET
-NEUTRON BURST BETWEEN t = -1s and +1s
-10 RECORDS STACKED $Q_W$ = 302.bpd  $Q_0$= 1117.bpd  $H_W$=0.32  $\theta$ = 0.0 DEGREE

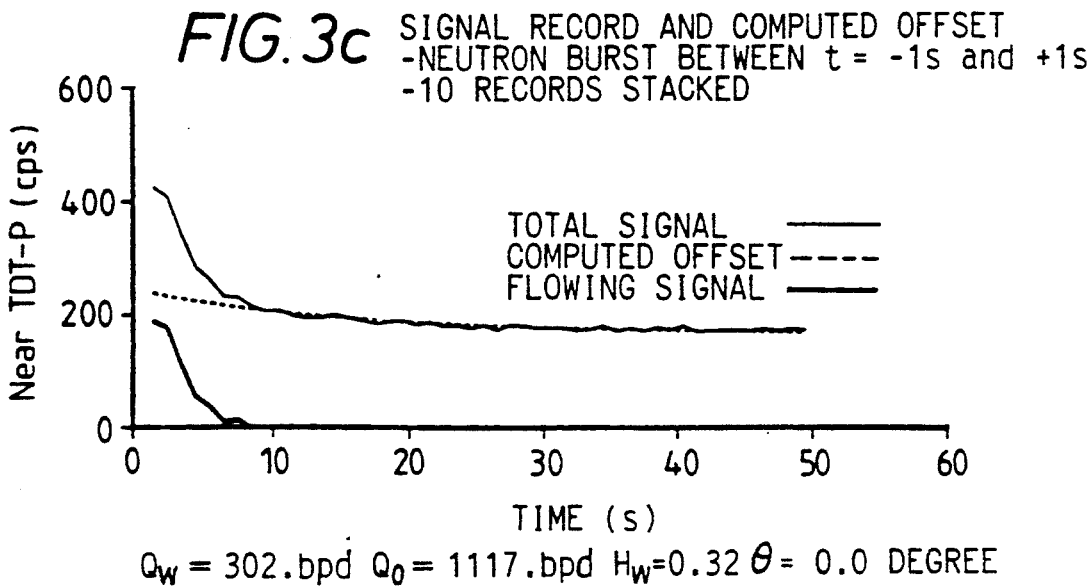

FIG.3c SIGNAL RECORD AND COMPUTED OFFSET
-NEUTRON BURST BETWEEN t = -1s and +1s
-10 RECORDS STACKED $Q_W$ = 302.bpd  $Q_0$= 1117.bpd  $H_W$=0.32  $\theta$ = 0.0 DEGREE DIFFUSIVITY MODEL BASED VELOCITY COMPARED WITH THE WATER VELOCITY ESTIMATED WITH THE GR DETECTOR DIFFUSIVITY MODEL BASED VELOCITY COMPARED WITH THE TOTAL VELOCITY ESTIMATED WITH THE GR DETECTOR

METHOD FOR DETERMINING THE FLOW RATE OF AQUEOUS PHASES IN A MULTIPHASE FLOW

CROSS REFERENCE TO RELATED APPLICATIONS

This application is a continuation in part of U.S. application Ser. No. 07/756,732 filed Sep. 9th, 1991 and assigned to Schlumberger Technology Corporation now abandoned, itself a continuation of application Ser. No. 07/524,246 filed May 16th 1990, now U.S. Pat. No. 5,047,632; also assigned to Schlumberger Technology Corporation.

BACKGROUND

Field of Invention

The present application provides a method for determining the flow rate of an aqueous phase of a multiphase flow. In particular the method is useful for determining the flow rate of the aqueous or "water" phase of a two phase flow in a hydrocarbon production well. In such a case, the other phase is an oil phase which is immiscible with the water phase which may contain dissolved substances as well as water.

A common method of monitoring the flow of fluids is to introduce some chemical or physical identifier, known as tracer, into the flow and then to monitor the passage of that tracer by means of some measurement. Examples include the introduction of saline solution into water flows and using electrical conductivity as a monitor, or introducing radioactive materials and using radiation detectors to track the progress of the fluid. A tool, called a Tracer Ejector Tool "TET", for injecting tracers into wellbore flows is commercialised by the company Schlumberger, frequently for monitoring the flows of water in injection wells. This tool and the methods of acquiring and interpreting the data are disclosed in U.S. Pat. Nos. 4,166,215 and 4,166,216. These patents relate to a tracer-survey method and apparatus for obtaining measurements representative of the dynamic flow characteristics of the continuous-phase present at one or more depth locations in a production well containing a lighter discontinuous-phase wellbore fluid. Minor amounts of suitable radioactive tracer are periodically discharged into the fluids at the selected depth location in the production well. Thereafter, by simultaneously monitoring the level of radioactivity present in the wellbore fluids above and below that depth location, measurements are obtained which are representative of one or more dynamic flow characteristics of the heavier continuous-phase at that depth location in the wellbore. These measurements are based on the travel time of the tracer from the location where it is discharged in the flow to another location where it is detected. However, the interpretation of the results has proved to be difficult due to the "smearing out" of the signal caused by the extensive mixing generated by the passage of the bubbles or droplets of the dispersed phase. Due to the large width of the signals obtained, it is difficult to locate precisely the peaks of the signals and therefore large errors are incurred by considering the time difference in peak arrival as representing the transit velocity of the flow.

A further method of monitoring fluid flow is disclosed in U.S. Pat. No. 4,233,508 granted to Arnold. In this case, instead of mixing a tracer with the fluid being monitored, the fluid is irradiated with neutrons. The patented method comprises a method of determining the flow characteristics of injection water in a perforated, cased hole. The injection water is irradiated with neutrons such that oxygen atoms in the water are transformed into radioactive nitrogen atoms. These are unstable and decay by emitting $\gamma$ radiation which is detected at various locations relative to the neutron activation location to determine the movement of the injection water in conjunction with separate measurements taken with a flow meter.

SUMMARY OF THE INVENTION

It is an object of the present invention to provide an activation method which can be used to determine the flow rate of an aqueous phase in a multiphase flow without the need for ancillary phase measurements.

It is a further object of the invention to provide such a method which requires no separate measurement of the volume fraction of the phases in order to determine volumetric flow rates.

In accordance with the present invention, there is provided a method of determining the flow rate of an aqueous phase of a multiphase flow circulating in a pipe, wherein a component of the aqueous phase is activated at a first location in the pipe and the concentration of the activated component is measured with a detector at a second location in the pipe as a function of time (t) so as to obtain a series of activated component data versus time; characterised in that a relationship $S(t)$ is fitted to the series of data so as to derive the values of the velocity $U$ of the aqueous phase.

The relationship $S(t)$ is given by:

$$S(t) = \frac{C_0 e^{-\lambda t}}{2}\left(erf\left(\frac{x_d + l_d - Ut}{2\sqrt{\kappa t}}\right) - erf\left(\frac{x_d - Ut}{2\sqrt{\kappa t}}\right)\right) \quad (I)$$

wherein $C_0$ is a constant, $x_d$ is the separation of the first and second locations and $l_d$ is the length of the detection. In this case separate measurement of the water phase holdup is required to extract the volumetric flow rate. This can be done using a gradiomanometer. The term "pipe" is used herein to designate any suitable conduit for a flow mixture.

BRIEF DESCRIPTION OF THE DRAWINGS

FIG. 2 shows a diagramatic view of the experimental equipment used to test the methods of the present invention;

FIGS. 3(a), 3(b) and 3(c) show the counts recorded at the near, far and $\gamma$ ray detectors;

DETAILED DESCRIPTION OF PREFERRED EMBODIMENTS

In the following description, the following notation is used:

A: Pipe cross-sectional area
$C_o$: Constant in interpretation (1)
h: Local holdup
H: Holdup integrated over space and time
$H_w$: Water holdup $l_d$: Length of detector
$q_w$: Instantaneous flowrate of water through pipe cross-section
$Q_t$: Total volumetric flowrate
$Q_w$: Water volumetric flowrate
$S(t)$: γray count as a function of time
$t$: Time
$T$: Averaging time
$U$: Advective velocity from interpretation (1)
$U_h$: Homogeneous velocity $Q_t/A$
$U_T$: Terminal rise velocity of a single bubble
$U_w$: Water velocity $Q_w/(H_wA)$
$v_w$: Local instantaneous water velocity
$x$: Axial distance
$x_d$: Separation of detector from source
$\delta$: Pipe deviation from vertical
$\kappa$: Diffusivity
$\lambda$: Decay constant of Oxygen-16

The invention will be hereafter depicted in connection with the logging techniques, of water flow, in a polyphase flow, in a pipe.

Figure 1:
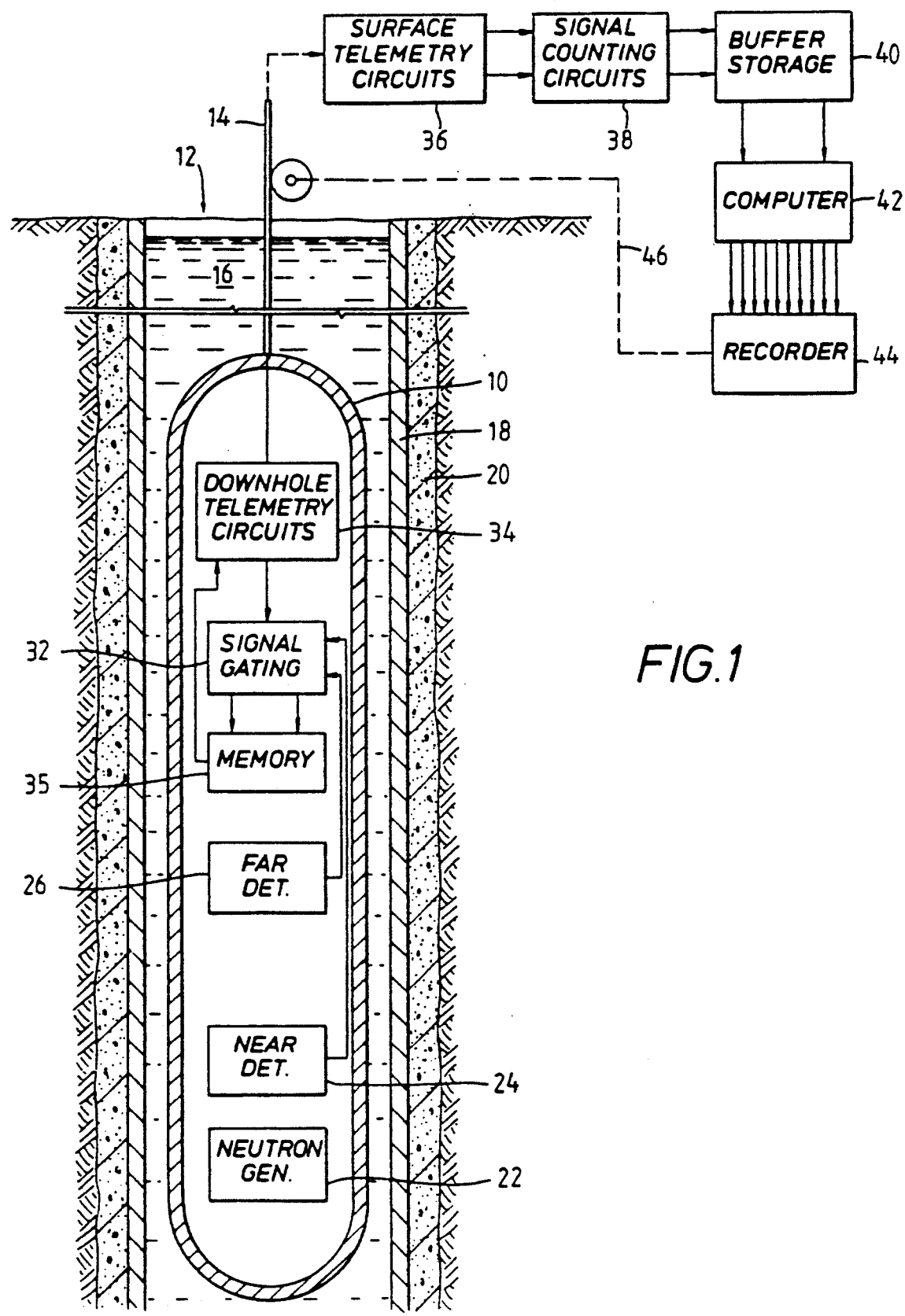
FIG. 1 shows a diagramatic view of a tool for performing the present invention.

An example of an embodiment of the invention is described and illustrated herein FIG. 1 showing a spectroscopy logging tool 10 suspended in a borehole 12 by an armoured cable 14. The tool 10 might be of the type described in U.S. Pat. No. 4,721,853, issued to Peter D. Wraight on Jan. 26, 1988 and assigned to Schlumberger Technology Corporation, and which is herein incorporated by reference.

FIG. 1 shows a well logging tool constructed in accordance with an example of embodiment of the invention and including a fluid-tight, pressure-and-temperature resistant sonde or tool 10 that is adapted to be suspended in an moved through a well bore 12 by an armoured cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different distances (or spacings) from the neutron generator 22. The detector 24 spaced closest to the neutron generator is designated the "near" detector and the detector 26 located farther from the neutron source is designated the "far" detector. For the illustration of the present invention, the neutron generator 22 is of the type which generates discrete pulses of fast neutrons, e.g. 14 MeV, and may for example be of the types described in more complete detail in U.S. Pat. No. 2,991,364 to C. Goodman, dated Jul. 4, 1961, and U.S. Pat. No. 3,546,512 to A. H. Frentrop, dated Dec. 8, 1970. This source emits 14 MeV neutrons having an energy level above the 10.2 MeV threshold energy level needed for the oxygen activation. Operation of the neutron generator 22 is controlled as usual by a neutron generator control circuit (not shown) which may also be of the type described in the aforementioned patents. The detectors 24 and 26 may be of any construction suitable for the detection of γ rays, such as thallium-activated sodium iodide scintillation detectors or bismuth germanate crystal detectors, and, in this respect, will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the well tool 10 is supplied over the cable 14 from a surface power supply (not shown), as is conventional.

Output pulses from the near detector 24 and the far detector 26 are applied to signal gating circuit 32 where the detector signals are counted and stored in memory and therefrom are applied to downhole telemetry circuits 34 for transmission to the surface over the cable 14. The overall design of the neutron generator control circuit, the signal gating circuits 32, the memory, and the telemetry circuits 34 are similar to that described in U.S. Pat. No. 4,721,853, but are not described here for the sake of brevity. These circuits are designed to achieve the timing schedules for neutron emissions and γ rays detection according to that discussed in detail below.

The downhole telemetry circuits 34 may be of any known construction for encoding, time division multiplexing, or otherwise preparing the data-bearing signals. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively, of command messages from the surface. Suitably, the circuits 34 and 36 comprise a bi-directional data telemetry system useful for these purposes and having at least a 10K bit per second upward data rate.

Following surface telemetry circuits 36, the near-detector and far-detector signals are separately counted in signal counting circuits 38 to acquire the counts data over a desired period of time, and then transferred to storage buffers 40.

From storage 40, the count data are processed in a computer 42, which suitably comprises a microprocessor or, alternatively, a general purpose digital computer such as that manufactured by Digital Equipment Corporation, Maynard, Mass., under the designation PDP-11. As is described more fully herebelow, the computer 42 processes the count data from the respective detectors to develop various desired outputs which may be recorded in conventional fashion as a function of tool depth in a recorder 44. The usual cable-following mechanical linkage, indicated diagrammatically at 46 in FIG. 1, is provided for this purpose.

EXPERIMENTAL EXAMPLES

Examples of methods according to the present invention will now be described. FIG. 2 shows a diagramatic representation of the experimental set-up used to obtain the results given below. The tool shown in FIG. 2 comprises a logging tool as shown in FIG. 1 and described above and a γ ray detector. The tool used comprises a tool body 50 housing a neutron generator 52 and a "near" radiation detector 54, a "far" radiation detector 56 and a γ ray detector 58 which are 326 mm, 619 mm and 4,539 mm from the neutron generator 52 respectively. For the purposes of this experimental method, the tool 50 is located centrally in a plexiglass pipe 60 of 156 mm internal radius forming part of a flow loop (not shown) and fed by pumps (also not shown). The tool 50 connected by a conventional wireline 62 to a conventional control unit for similar tools. The pipe 60 is inclinable between 0° (vertical) and 90° (horizontal). A differential pressure measuring device (gradiomanometer) 64 is located in the pipe wall near the γ ray detector 58.

For experimental purposes, kerosene and water are pumped through the pipe 60 past the tool 50. The densities of the kerosene and water are $P_o=70$ kg/m$^3$ and $P_w=1000$ kg/m$^3$ respectively.

The method of the present invention is based on the detection of $\gamma$ rays emitted by the oxygen atoms in water which are excited by a neutron pulse according to reaction (1). The $\gamma$ rays are recorded as the excited molecules pass the detectors.

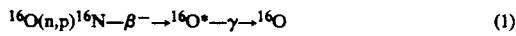
(1)

The fast neutrons (14 MeV) emitted by the minitron interact with the oxygen nuclei transforming them into nitrogen 16. The nitrogen nuclei are unstable with a 7.13 s half life period and decay via $\beta^-$ radioactivity to the first excited state of oxygen 16 nuclei which instantaneously decay to their ground state emitting a 6.13 MeV $\gamma$ ray.

The reaction has already been used to detect the water flowing behind the casing, see eg SPE 20586. In the present experiments the time of the pulse is set to 2 s. To filter the statistical noise due to nuclear phenomena and flow turbulences an ensemble average have been used. The experiments are repeated and stacked until the noise is eliminated. Usually good filtering is obtained with 10 stacked experiments.

One of the problems with the nuclear method if that the neutron pulse interacts not only with the oxygen of the flowing water but also with the stagnant water and other material around the minitron. Also natural $\gamma$ rays are detected both of these introducing an offset from zero for the measured count including the activated water. The total counts recorded at the detector are plotted with a light line on FIG. 3, the burst of neutrons is 2 seconds long, between $-1$ and $+1$ s. The offset is not negligible and comprises a constant value, B, due to natural $\gamma$ ray and elements with a long life time created by the fast neutrons, and an exponential part, $C\,e^{-\lambda t}$, due to stagnant water. The equation of the signal is:

$$S(t) = B + Ce^{-\lambda t} + Df(t) \tag{2}$$

Where D f(t) is the part due to the flowing water, and $\lambda = 0.097$ s$^{-1}$ is the decay constant of the oxygen.

By iterating, the offset $B+C\,e^{-\lambda t}$ can be extracted from the signal without any assumption on the function f. FIG. 3 shows the efficiency of the method, the offset is plotted in dotted line. The difference between the measured signal and the offset is called "flowing signal", it is plotted in bold line on FIG. 3.

By fitting the number of counts from a detector with a relationship S(t), a value for water flow rate can be obtained. One suitable relationship is given by equation (I):

The technique assumes that the flow can be characterised by the average velocity U and diffusivity $\kappa$ of a slug of water that is convected along the pipe (assuming that it is "well-mixed" across the pipe). If C(x,t) is the concentration of tracer at any point x in the pipe at time t, and S(t) is the signal as received at the detector then:

$$S(t) = \frac{C_o e^{-\lambda t}}{2}\left(erf\left(\frac{x_d + l_d - Ut}{2\sqrt{\kappa t}}\right) - erf\left(\frac{x_d - Ut}{2\sqrt{\kappa t}}\right)\right) \tag{I}$$

The method of interpretation is to fit this relationship to the measured signal using a non-linear least-squares fitting technique. Values for detector spacing $x_d$ and detector length $l_d$ are specified from the tool geometry and the decay time $\lambda$ is known. The value found for U is then assumed to be the average water convective velocity $U_w(=Q_w/AH_w^1)$, and the value for $\kappa$ is the total diffusivity of the water phase. The value of $C_o$ is not used in the interpretation but is a useful measure of consistency between measurements at different stations and is related to the water holdup, the activation efficiency and the detector efficiency. If water is the continuous phase then $\kappa$ is best considered to be the sum of the single-phase diffusion and the diffusion caused by the passage of bubbles.

This method needs no calibration to derive average water velocity but a separate holdup measurement is required to convert the velocity into the flowrate required for an interpretation. This can be obtained from a gradiomanometer device or the like.

Because there is a time effect seen in the nuclear reaction used in this method, the spacing of the detectors from the neutron generator and the flow rate encountered will affect the quality of results from each detector. Generally, the higher the flow rate, the further a detector must be from the neutron generator to obtain optimum results. The optimum spacing can be determined according to requirements.

Figure 4:
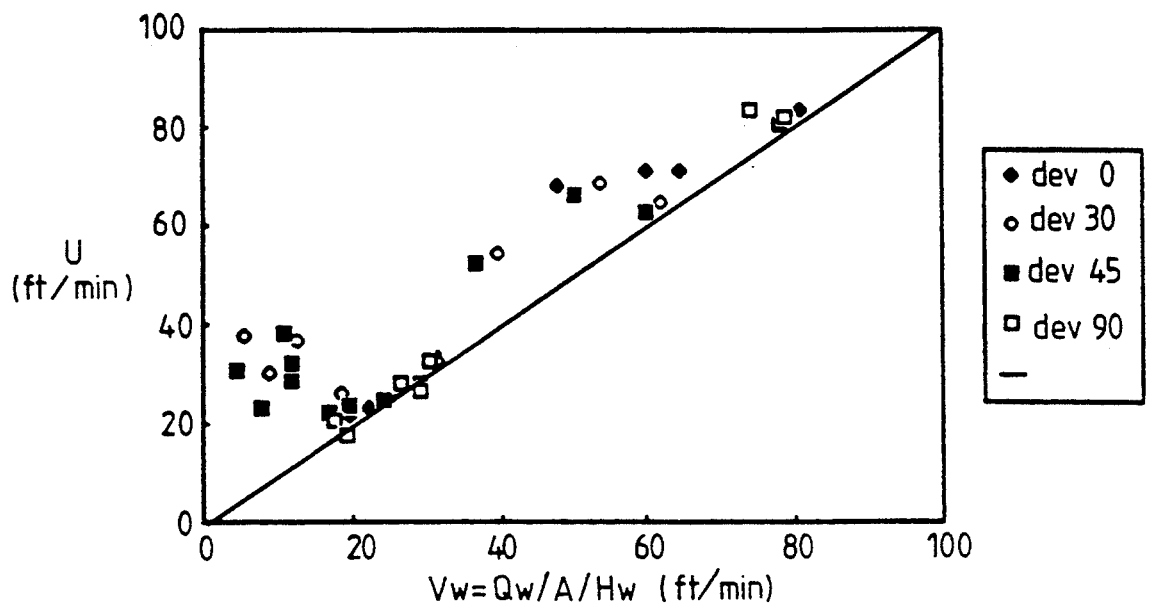
FIG. 4 shows the results of experimental data compared to water velocity.
Figure 5:
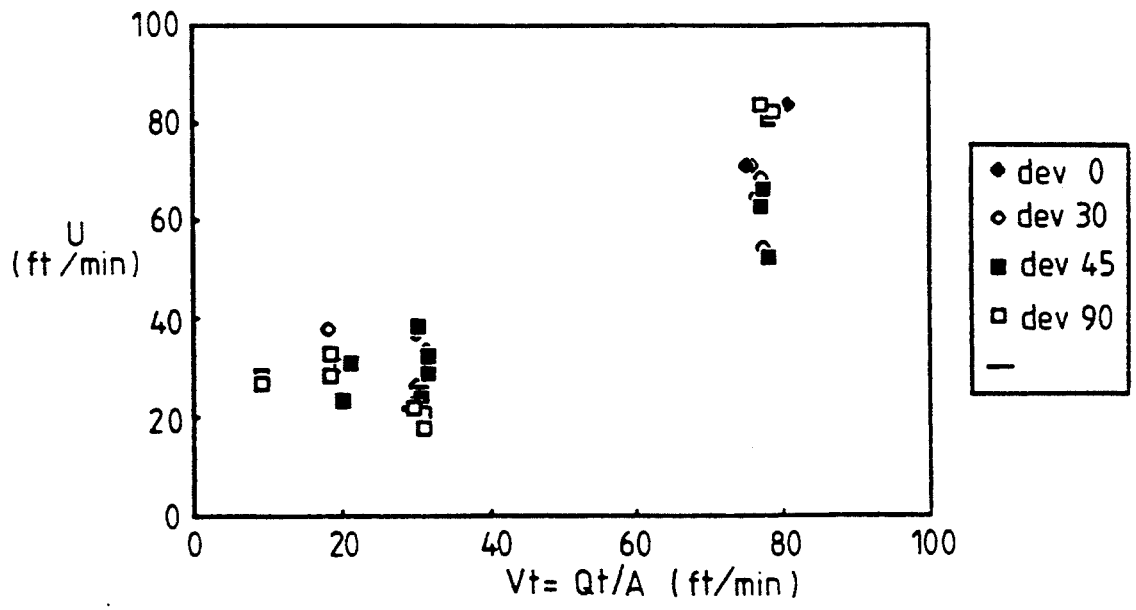
FIG. 5 shows the results of experimental data compared to total velocity.

Examples of measurements of flow rate at different inclinations are shown in FIGS. 4-5. FIGS. 4 and 5 show results obtained using relationship (I). In FIG. 4 the water velocity $U_w$ obtained from $Q_w/AH_w^1$. In FIG. 5 the total velocity Vt is given by $Q_t/A$.

The volumetric flow rate $Q_1$ of the aqueous phase can be determined according to the relationship $$Q_l = UAy_l \tag{3}$$

The volumetric flow rate $Q_b$ of the non-aqueous phase can be determined according to the relationship $$Q_b = (v_s + U)A(1 - y_l) \tag{4}$$

In equations (3) and (4) $y_l$ is the volume fraction of the aqueous phase and $v_s$ is the local instantaneous velocity.

I claim:

1. A method of determining the flow rate of an aqueous phase of a multiphase flow circulating in a pipe, comprising activating a component of the aqueous phase at a first location in the pipe and measuring the concentration of the activated component with a detector at a second location in the pipe as a function of time (t) so as to obtain a series of activated component data versus time; the method being characterised by fitting a relationship S(t) to the series of data so as to derive the values of the velocity U of the aqueous phase.

2. A method as claimed in claim 1, wherein the relationship S(t) is given by:

$$S(t) = \frac{C_o e^{-\lambda t}}{2}\left(erf\left(\frac{x_d + l_d - Ut}{2\sqrt{\kappa t}}\right) - erf\left(\frac{x_d - Ut}{2\sqrt{\kappa t}}\right)\right)$$

wherein $C_o$ is a constant representing an initial tracer concentration, $l_d$ is the length of detector, S(t) is the $\gamma$ ray count as a function of time, t is time, U is the advective velocity, $x_d$ is the separation of detector from source, $\kappa$ is diffusivity, and $\lambda$ is the decay constant of Oxygen-16.

3. A method as claimed in claim 1, wherein said relationship S(t) is of the form:

$$S(t) = \frac{C_o}{2}\left[erf\left(\frac{x_s + \Delta x - Ut}{2\sqrt{\kappa t}}\right) - erf\left(\frac{x_s - Ut}{2\sqrt{\kappa t}}\right)\right]$$

wherein $C_o$ is a constant representing an initial tracer concentration, $x_s$ is the distance between the first and second locations, $\Delta x$ is the length of the detector, erf is the error function, t is time, U is the advective velocity, and $\kappa$ is diffusivity.

4. A method for determining a volumetric flow rate for an aqueous phase of a multiphase flow circulating in a pipe, the method comprising the steps of:

activating a component of the aqueous phase at a first location in the pipe;

measuring the concentration of the activated component at a second location in the pipe with a detector as a function of time t so as to obtain a series of activated component-concentration data versus time;

fitting a relationship S(t) to the series of data so as to derive the values of the velocity U of the aqueous phase; and determining the volume fraction $y_l$ of the aqueous phase in the pipe and determining the volumetric flow rate $Q_l$ of the aqueous phase in accordance with the relationship $Q_l = UAy_l$ wherein A is the flowing area.

5. A method as claimed in claim 4 comprising determining the volume fraction $y_l$ with a gradiomanometer.

6. A method as claimed in claim 4 further comprising the step of determining the volumetric flow rate $Q_b$ of a non-aqueous phase by the following relationship:

$Q_b = (v_s + U)A(1 - y_l)$ wherein A is the pipe cross-sectional area, $v_s$ is the local instantaneous velocity, U is the advective velocity, and $y_l$ is the volume fraction of the aqueous phase.

* * * * *